Dec. 12, 1950 F. T. COFFEY, SR 2,533,560
MOTION-PICTURE PROJECTOR HAVING CAM OPERATED
INTERMITTENT FILM FEED AND SHUTTER
Filed Dec. 7, 1946 3 Sheets-Sheet 1

INVENTOR.
Francis T. Coffey, Sr.
BY
William E. Hall
ATTORNEY.

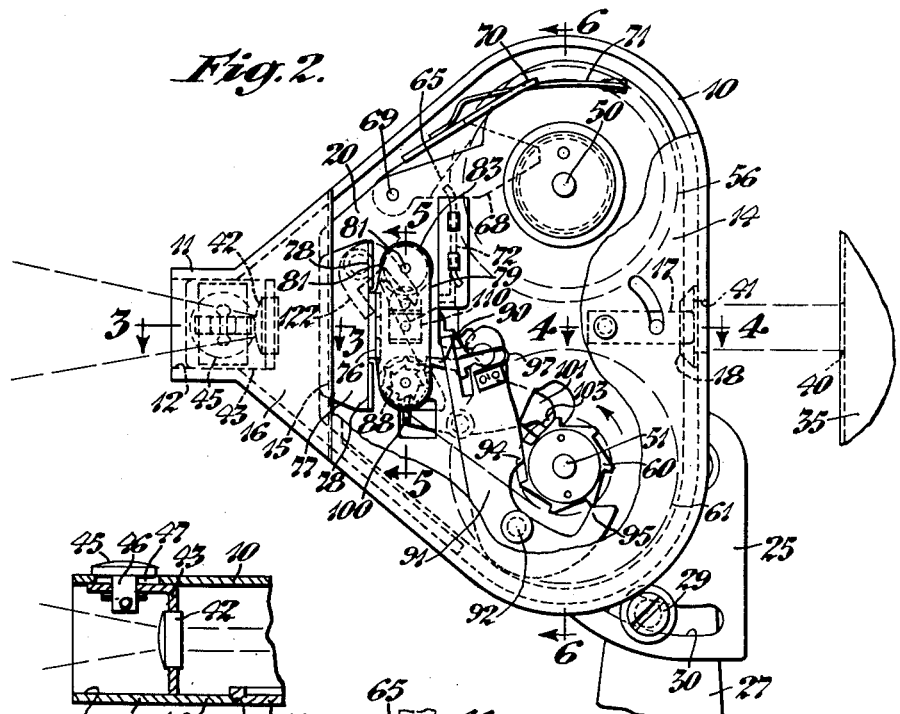
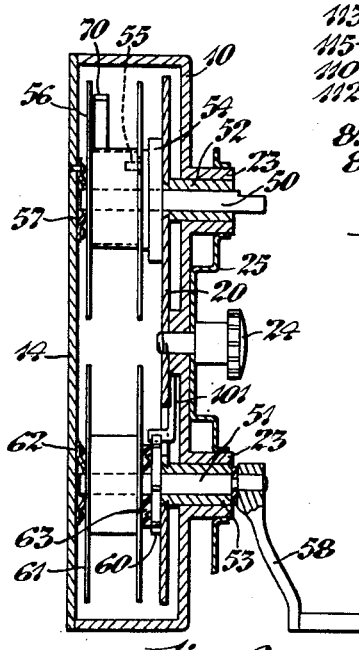

Dec. 12, 1950

F. T. COFFEY, SR  2,533,560
MOTION-PICTURE PROJECTOR HAVING CAM OPERATED
INTERMITTENT FILM FEED AND SHUTTER

Filed Dec. 7, 1946

INVENTOR.
Francis T. Coffey, Sr.
BY
William E. Hall
ATTORNEY.

Patented Dec. 12, 1950

2,533,560

UNITED STATES PATENT OFFICE 2,533,560

MOTION - PICTURE PROJECTOR HAVING CAM OPERATED INTERMITTENT FILM FEED AND SHUTTER

Francis T. Coffey, Sr., Los Angeles, Calif.

Application December 7, 1946, Serial No. 714,719

9 Claims. (Cl. 88—18)

My invention relates to a device for exhibiting motion and still pictures upon a screen and adapted for use as a viewer for facilitating inspection of small still pictures arranged in strip form.

Various types of projectors are employed for exhibiting motion and still pictures upon a screen, and their use is limited to such a purpose. In order to examine the individual pictures of a strip or chain of pictures, devices, commonly termed "viewers," are employed, such devices usually including means for illuminating the individual pictures and having means for magnifying the pictures. It is one object of this invention to provide a device which may be used either for projecting motion or still pictures upon a screen, or as a viewer for holding the pictures, and including means for illuminating and magnifying the same.

Another object is to provide a device of the character referred to having means for supporting a strip or roll of motion picture film, means for guiding the film, means for intermittently feeding the film to align successive pictures of the strip with an aperture therein, illuminating means for projecting a beam of light through the pictures aligned with said aperture, a magnifying lens through which the pictures are projected upon a screen, and an improved shutter means operated in synchronism with the film feeding means for permitting the passage of light through the film when the individual pictures are in register with the aperture and for disrupting the projection of light therethrough during the feeding movement of the film.

Another object is to provide a shutter device which is adapted to oscillate with a quick and positive snap action, so as to assure complete suppression of the light during the feeding movement of the film.

Another object is to provide a shutter device which is of U-shape, the opposite sides of which are normally disposed in planes extending parallel to the beam of projected light to permit the light to pass therebetween, said shutter being oscillated to a position wherein its sides overlap slightly to completely cut out the beam of light, this construction providing effective suppression of the light with a very slight movement of the shutter.

Another object is to provide a device wherein the film-feeding and shutter-operating mechanisms are actuated by a single cam means, thereby insuring positive synchronization and greatly simplifying the structure.

Another object is to provide a device of the type indicated in which the illuminating means is located outside the main casing and adapted to be readily detached therefrom when the device is to be used for viewing still pictures, and it is a further object to provide a reflector mirror adjustably mounted with respect to the casing and adapted to reflect daylight or artificial light into the casing to cause it to pass through the individual pictures which may be viewed by looking through the magnifying lens.

Another object is to provide in a device of the type specified means for rewinding the film and including means for indicating the amount of film wound onto the supply reel.

Another object is to provide means for releasing the film-feeding or advancing means to permit retrogressive movement of the film during the rewinding operation.

Another object is to provide a device which is adjustably mounted on a supporting standard, and which may be readily detached from the standard and held in the hand when still pictures are to be viewed in the casing.

Further objects of my invention are set forth in the following specification which describes a preferred embodiment of the device, by way of example, as illustrated in the accompanying drawings. In the drawings:

Fig. 2 is a similar view of the opposite side of the device;

Fig. 3 is a sectional plan view, taken on line 3—3 of Fig. 2;

Fig. 4 is a sectional plan view, taken on line 4—4 of Fig. 2;

Fig. 5 is a cross-sectional view, taken on line 5—5 of Fig. 2;

Fig. 6 is a cross-sectional view, taken on line 6—6 of Fig. 2;

Figure 1:
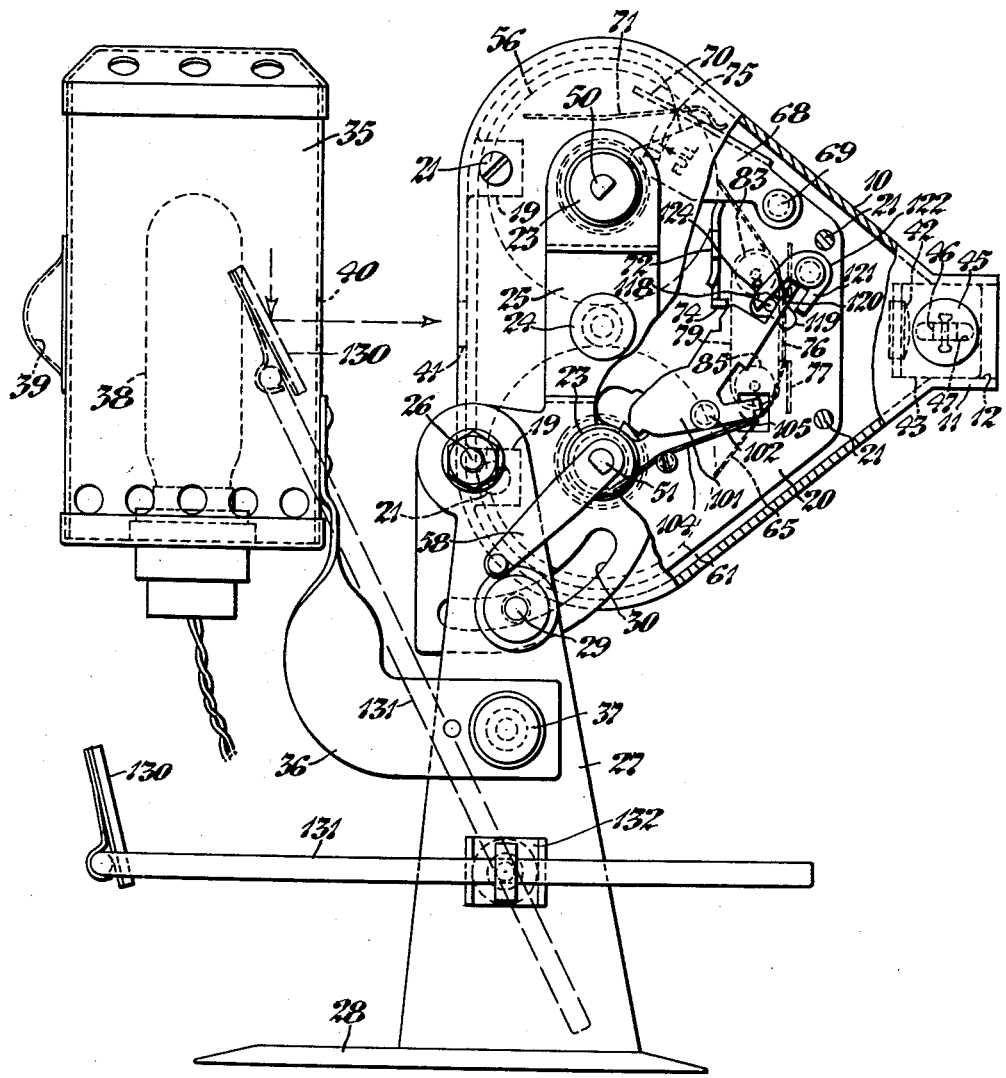
Fig. 1 is an elevational view of one side of the device with a part of the casing broken away to illustrate certain interior elements.

Referring to the drawings in detail, the improved device comprises a hollow box-like casing 10 of substantially triangular configuration having one apex extended in a tubular portion 11 having an opening 12. The other apices of the triangle are rounded to provide arcuate recesses in which the film reels are mounted in the manner to be hereinafter explained. The casing 10 preferably is molded from any suitable plastic material, and one side is provided with a removable cover 14. The cover 14 has a tapered forward edge which fits under the rearward edge 15 of a vertical plate-like portion 16 of the casing 10, and at the opposite end of the cover is a pivoted latch 17 which is adapted to underlie a metal flange 18 carried by the casing (Figs. 2 and 4) to releasably retain the cover in closed position. By tilting the latch 17, the cover 14 is unlocked and may be removed to permit insertion and removal of the film and to permit inspection of the internal mechanism. The casing 10 is formed with spaced pads 19 on its interior against which a mounting plate 20 is fastened by screws 21, the plate serving as a support for the various operating parts of the device.

The casing 10 is provided with a pair of vertically spaced bearing bosses 23, which rotatably support the reel spindles in the manner later explained. Fastened to the side of the casing 10 by a thumb screw 24, and having holes for receiving the bearing bosses 23, is a bracket 25 adapted to be pivotally mounted on a stud 26 held in the upper end of a sheet metal standard 27 having a base 28 adapted to rest upon a table or other support. A screw 29 passes through an arcuate slot 30 in the bracket 25 and a hole in the standard 27, and a thumb-nut is screwed onto the threaded end of the screw to secure the casing 10 in different positions of angular adjustment.

A sheet metal box 35 is carried by an angular arm 36 removably secured to the side of the standard 27 by a thumb-screw 37, and in the box is an electric lamp 38. A concave reflector surface 39 in the box is adapted to project the rays of light emanating from said lamp through an opening 40 in the forward side of the box and through a rectangular opening 41 in the rearward side of the casing 10, the light passing through the casing and being emitted through the opening 12 in the forward side of the casing. In the opening 12 is a magnifying lens 42, which is carried by an angular slide 43 adapted to be moved in the tubular portion 11 to focus the projector, as later explained. An adjusting knob 45 disposed on the outside of the portion 11 has a stem 46, which projects inwardly through an elongated slot 47 in the portion 11 and through a hole in the slide 43. By moving the knob 45 forwardly and rearwardly the lens 42 is adjusted with respect to the film to focus the pictures projected through the opening 12.

A pair of spindles 50 and 51 are rotatable in bearing sleeves 52 and 53 carried by the supporting plate 20, the sleeves passing through the bearing bosses 23 of the casing 10 (Fig. 6). The upper spindle 50 has a flange 54 provided with a pin 55, and a flanged film-supply reel 56 is adapted to be slid onto this spindle and has holes in one end, any one of which are adapted to receive the pin to key the reel and spindle together. The other end of this reel rests against a resilient ring 57 on the cover 14. The outer projecting end of the spindle 50 is flattened off to adapt it to receive a handle 58, which serves as the means for rotating the spindle and its reel 56. The lower spindle 51 is similarly journaled in the sleeve 53, but in place of the flange this spindle has a cam disc 60 abutting the plate 20. A wind-up reel 61 is rotatably mounted on the inner end of the spindle 51, but is frictionally secured thereon by a friction ring 62 on the cover 14, which urges the reel against a rubber washer 63 arranged on the spindle against the cam disc 60. When the lower spindle 51 is rotated in clockwise direction, as viewed in Fig. 1, the film 65 is drawn off from the supply reel 56 and wound onto the take-up reel 61. The film 65 may be of a common type having a series of frames or pictures and a series of rectangular apertures 66 located adjacent one of its edges.

The film 65, which is wound on a reel 56, is adapted to be unwound therefrom with the reel rotating on the spindle 50. An indicator arm 68 is pivoted on a pin 69 on the plate 20, and has a finger 70 which is adapted to overlie the film on the reel 56. The arm 68 is urged in a direction to move its finger toward the roll of film 65 by means of a wire spring 71, but is normally withheld from contact with the film by a locking element 72, which is slidable in a vertical slot in the plate 20, the element having a laterally projecting lug 74 at its lower end for a purpose to be later explained. The ends of the locking element 72 frictionally engage the plate 20 to retain it in either upper or lower positions. The indicator arm 68 has an index mark which is adapted to register with graduations 75 (Fig. 1), on the plastic casing 10 which indicate the diameter of the roll of film. When the locking element 72 is slid down, the arm 68 is permitted to swing down to cause the finger 70 to engage the film to indicate the amount of film wound on the reel 56. This is particularly useful when rewinding the film from the reel 61 onto the reel 56.

After drawing off from the supply reel 56, the film 65 passes downwardly across the vertical plate 76 of a guide member 77, which is fastened to the plate 20 and which has fingers 78 for retaining the film thereagainst. The member 77 has an offset portion 79 which extends parallel to the plate 20. The vertical portion 76 has a rectangular aperture 80. Rotatable in holes in the portion 79 and the plate 20 are upper and lower shafts 81 and 82. The upper shaft 81 carries a freely rotatable flanged film-guiding roller 83 over which the film 65 passes before drawing across the plate 76. Fast on the lower shaft 82 is a second guide roller 85 over which the film passes before being wound onto the reel 61. The roller 85 is formed with a toothed flange 86, the teeth of which are engageable in the apertures 66 of the film 65, and when the roller is rotated the film is fed to the reel 61.

Also fast on the shaft 82 is a ratchet wheel 88, which is adapted to be intermittently rotated through a part of a revolution by means of a pawl 90 pivotally mounted at the upper end of a feed-lever 91. The lever 91 is pivoted on a pin 92 at the lower end of the plate 20 and has an arcuate recess 93 providing spaced projections 94 and 95. The projections 94 and 95 are located at opposite points on the periphery of the rotatable cam disc 60, and are adapted to be engaged by the tooth-like cam surfaces 96 of the disc. When the cam disc 60 is rotated in counterclockwise direction, as viewed in Figs. 7 and 8, the feed-lever 91 is oscillated, and through means of its pawl 90 the ratchet wheel 88 is rotated through the angular distance of one tooth. A spring 97 on the lever 91 engages the pawl 90 to maintain the latter in engagement with the ratchet teeth during the feeding operation.

A check-pawl 100 is provided for engaging successive teeth of the ratchet wheel 88 to prevent retrogressive movement of the feed roller 85 and film 65. The check-pawl 100 is formed integral with a lever arm 101, which is pivoted on a pin 102 held in the plate 20, the lever-arm having a follower-lug 103 engageable with the cam surfaces 96 of the disc 60. The arrangement is such that the check-pawl 100 is released from the teeth of the ratchet-wheel 88 during the feeding of the film 65 under the action of the feeding pawl 90, and after the ratchet-wheel has been indexed, the lever-arm 101 is released by the cam disc 60 and a spring 104 (Fig. 1) engageable with a finger 105 of the lever-arm acts to pivot the lever-arm in clockwise direction, as viewed in Fig. 7, to cause the check-pawl 100 to engage the ratchet teeth to prevent reverse rotation of the feed-roller 85. The cam disc 60 is rotated by means of the handle 58 which is removably attached to the spindle 51, as shown in Fig. 1. In order to rewind the film 65 back onto the supply reel 56, it is necessary that the pawls 90 and 100 be retracted from and remain out of engagement with the ratchet-wheel 88 to permit reverse rotation of the feed-roller 85. This is accomplished by depressing the locking element 72 to cause its lug 74 to engage in a notch 107 in the upper inclined edge of the lever-arm 101 to withdraw the check-pawl 100 from the ratchet-wheel. The lug 74 also engages the upper curved edge of the feed-lever 91 to withhold the latter from oscillation.

Figures 7, 8:
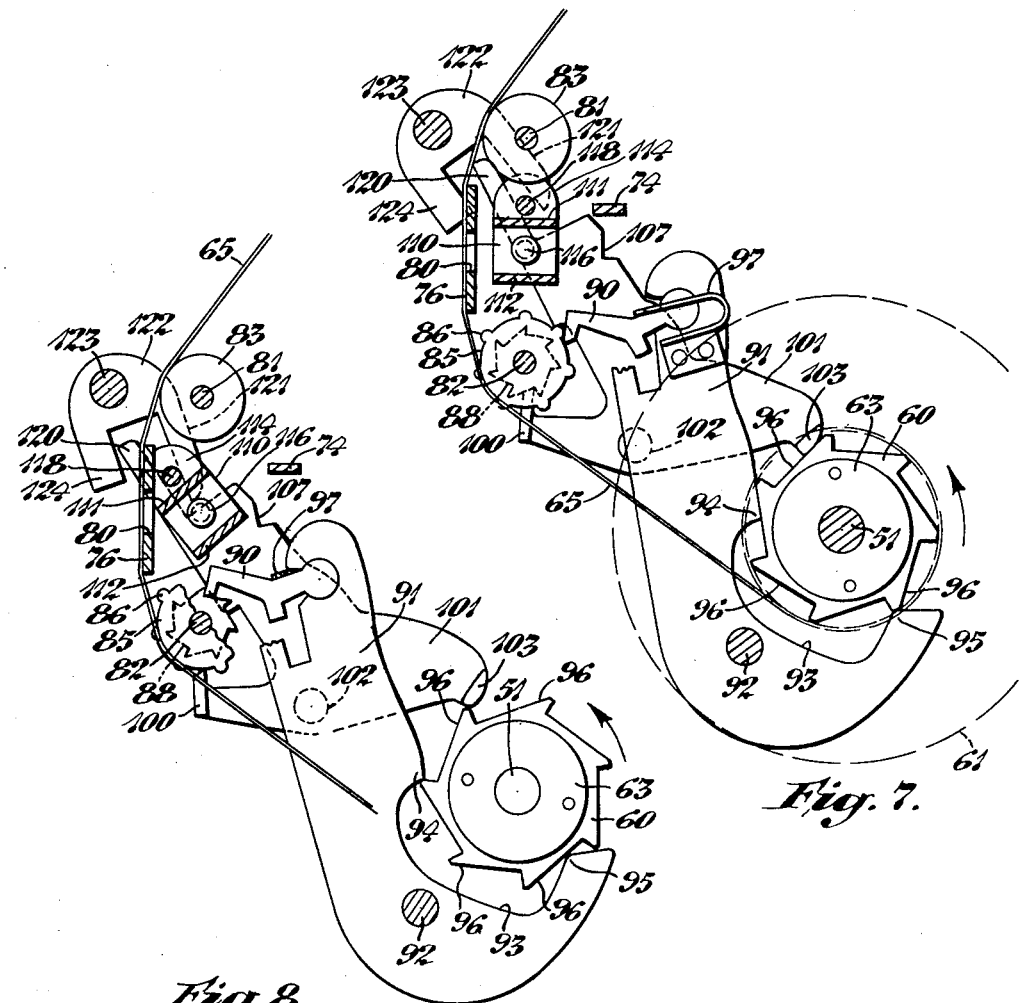
Fig. 7 is an enlarged fragmentary side elevation of the film-feeding and shutter mechanism, and showing the relation of the parts of the mechanisms during the projection of a picture from the device.
Fig. 8 is a view similar to Fig. 7, but illustrating the relation of the parts during the feeding or advancing of the film.

As is well known, it is necessary to prevent the passage of light through the film during its intermittent feeding movement. In the present device, the passage of light is interrupted by means of a shutter of improved construction. As shown in Fig. 5, the shutter 110 consists of a U-shaped strip of metal having upper and lower sides 111 and 112 connected at one end by a vertical crosspiece 113. At the other end of the shutter, the lower side 112 is bent upwardly in a flange 114. The cross-piece 113 and flange 114 are pivoted on aligned pins 115 and 116 in the offset portion 79 of the guide member 77 and the plate 20, respectively, to adapt the shutter 110 to be oscillated on a horizontal axis. The flange 114 is provided with a pin 118 which projects laterally through an arcuate opening 119 in the plate 20, see Figs. 1 and 5. The projecting end of the pin 118 is positioned between a finger 120 at the upper end of the lever-arm 101 and one leg 121 of a forked operating element 122. The element 122 is pivoted on a pin 123 and has a second leg 124 spaced from the leg 121. When the lever-arm 101 is pivoted by the cam disc 60, to disengage the check-pawl 100 from the ratchet-wheel 88 during the indexing of the feed-roller 85, the finger 120 of the lever-arm strikes the leg 124 of the operating element 122 to rotate the latter from the position shown in Fig. 7 to that illustrated in Fig. 8. During this movement, the leg 121 of the element 122 strikes the pin 118 to rapidly pivot the shutter 110 to the position indicated in Fig. 8, so that the shutter is closed with a snap action. In its closed position, the sides 111 and 112 of the shutter 110 are inclined at an angle of approximately 45°, as shown in Fig. 8, so that the beam of light, indicated by the dash lines in this view, is interrupted and prevented from passing through the aperture 80 and that portion of the film 65 which rests against the plate 76 of the guide member 77 and aligned with the aperture.

The operation of the device as a motion picture projector should be apparent from the foregoing description, and only a brief explanation thereof is deemed necessary. Assuming that a roll of film 65 is mounted on the supply reel 56 with its leading end extending downwardly across the aperture 80 and feed-roller 85 and secured to the take-up reel 61, the lamp 38 is lighted to project a beam of light through the several openings 40, 41, 80, and 12, to project the image of the picture aligned with the aperture 80 upon a suitable screen (not shown). The lens 42 is adjusted forwardly or rearwardly to properly focus the image upon the screen, and the device is then ready for operation. To operate the device, the handle 58 is mounted on the lower spindle 51, and by turning the handle the reel 61 is rotated in a direction to wind on the film. As the spindle 51 is thus rotated, the cam disc 60 acts to intermittently oscillate the lever 91 and lever-arm 101. As before explained, the lever-arm 101 acts to disengage the check-pawl 100 from the ratchet-wheel 88, and, simultaneous with this movement, the lever 91, acting through the feed-pawl 90, turns the ratchet-wheel and roller 85 in a direction to feed the film forwardly. During the operative stroke of the lever-arm 101, its finger 120 acts to turn the element 122, which functions through its leg 124, to rapidly pivot the shutter 110 from the position shown in Fig. 7 to that illustrated in Fig. 8, to momentarily disrupt the passage of light through the film. As the cam disc 60 continues its rotation, the parts will be returned to first position with the check-pawl reengaging the ratchet-wheel 88 to prevent retrogressive movement of the feed-roll 85 and film 65 and with the feed-pawl 90 assuming its inoperative position, shown in Fig. 7. The lug 103 of the lever-arm 101 is held in firm engagement with the cam disc 60 by the spring 104, so that when the lug rides down the abrupt side of a cam lobe of the disc the finger 120 will act to quickly return the pin 118 to first position to move the shutter 110 to initial position with a snap action. With the shutter thus disposed, the beam of light may again pass between its sides 111 and 112 and through the aperture 80 and film 65 to project the second picture or frame onto the screen. Continuous rotation of the cam disc 60 will effect intermittent oscillation of the parts and feeding of the film, and if it is desired to project a still picture onto the screen the film may be stopped for this purpose. After the film has been fed onto the reel 61, it is rewound back onto the supply reel 56 by first rendering the feed mechanism inoperative by merely depressing the locking element 72, this element serving to withhold the various moving parts from actuation and permitting reverse rotation of the feed roller 85. The handle 58 is applied to the upper spindle 50 and turned to cause the film 65 to be wound back onto the reel 56. During the rewinding operation, the finger 70 of the indicator arm 68 rests upon the roll of film being wound on the reel 56, and the arm registers with the graduations 75 to indicate the amount of film on the reel, it being noted that such indication may also be obtained during the picture-projecting operation by merely depressing the locking element 72 to permit the finger 70 to contact the roll of film on the reel 56. To insert or remove a roll of film, it is only necessary to remove the cover 14 and slide the reel onto or remove it from the spindle 50 or 51, as the case may be.

To employ the device as a viewer to inspect the individual pictures of a film, the source of light 38 may be dispensed by removing the bracket 36 and light box 35 from the standard 27.

To view the pictures of the film, the end 11 of the device is placed close to the eye of the person, who then looks through the magnifying lens 42 to view the picture which is aligned with the aperture 80. In order to illuminate the picture being viewed, the device is pointed toward any ordinary light to cause the rays of light to enter the casing 10 by way of the opening 41 and to be projected through the film. When the device is resting upon a table, or the like, a reflector member may be utilized for reflecting the rays of light from a source located above the table into the device. The reflector member may consist of a mirror 130 mounted for angular adjustment at the end of a rod 131, which is slidable in a holder 132 pivotally connected to the standard 27. By pivoting the holder 132, sliding the rod 131, and pivoting the mirror 130, the latter may be adjusted to different heights and angles to adapt it to reflect the light rays into the casing 10, as shown by dash lines in Fig. 1. Each picture of the film may be viewed by simply turning the spindle 51 by means of the handle 58 in the manner before explained.

While I have herein shown and described the picture-projecting and viewing device as embodied in a preferred form of construction, by way of example, it will be understood that various modifications may be made in its construction without departing from the spirit or scope of the invention. Consequently, I do not wish to be limited in this respect, but desire to be afforded the full scope of the appended claims.

I claim:

1. In a motion picture projector: a casing having an opening in one of its sides; a magnifying lens adjustably mounted in said opening; means in said casing for supporting a strip of motion picture film; a light source adapted to project a beam of light through said film; a guide member through which said film is adapted to travel, said guide member having an aperture; shutter means movable intermittently between said aperture and said light source across the beam of light for interrupting the passage of said light beam through said aperture and said film during the feeding of said film and to permit the passage of said light beam through said aperture when each frame of said film is at rest in alignment with said aperture; a feed roller associated with said guide member and across which said film is adapted to pass, said roller having teeth engageable in spaced apertures in said film and adapted upon rotation of said roller to advance said film to align successive frames of said film with said aperture; a ratchet-wheel coaxial with and rotatable with said roller; a lever pivoted in said casing and movable toward and away from said ratchet-wheel; a pawl pivoted on said lever and engageable with successive teeth of said wheel for intermittently advancing said roller; a rotatable cam for pivoting said lever; a second lever pivoted in said casing and actuated by said cam; a check-pawl on said second lever engageable with said ratchet teeth for preventing retrogressive movement of said ratchet wheel; and interengaging means on said second lever and said shutter means for operating said shutter means.

2. A combination as defined in claim 1 and including means for withholding said levers from actuation by said cam to permit reverse rotation of said roller.

3. A combination as defined in claim 1 and including manually operable means adapted to engage said levers to withhold said levers from actuation by said cam to permit reverse rotation of said roller.

4. A combination as defined in claim 1 in which said light source is disposed outside said casing and adapted to project a light beam through an opening in said casing.

5. A combination as defined in claim 1 in which said casing is carried by a standard and in which said light source is mounted in a box detachably secured to said standard and disposed adjacent said casing, said box and said casing having aligned openings through which said beam of light is adapted to enter said casing.

6. In a motion picture projector: a casing having an opening in one of its sides; a magnifying lens adjustably mounted in said opening; a supply reel rotatably mounted in said casing and adapted to support a strip of motion picture film; a wind-up reel rotatably mounted in said casing and adapted to wind up said film unwound from said supply reel; a guide member between said reels through which said film is adapted to travel, said guide member having an aperture; shutter means movable intermittently between said aperture and said light source for interrupting the passage of said light beam through said aperture and said film during the feeding of said film and to permit the passage of said light beam through said aperture when each frame of said film is at rest in alignment with said aperture; a feed roller associated with said guide member and across which said film is adapted to pass, said roller having teeth engageable in spaced apertures in said film and adapted upon rotation of said roller to advance said film to align successive frames of said film with said aperture; a source of light adapted to transmit a beam of light through said aperture and said film to project the pictures of said film through said lens; a ratchet-wheel coaxial with and rotatable with said roller; a lever pivoted in said casing and movable toward and away from said ratchet-wheel; a pawl pivoted on said lever and engageable with successive teeth of said wheel for intermittently advancing said roller; a rotatable cam for pivoting said lever; a second lever pivoted in said casing and actuated by said cam; a check-pawl on said second lever engageable with said ratchet teeth for preventing retrogressive movement of said ratchet-wheel; interengaging means on said second lever and said shutter means for operating said shutter means; and manually operable means engageable with said levers to withhold said levers from actuation by said cam whereby to release said pawls from said ratchet-wheel and permit reverse rotation of said roller so that said supply reel may be rotated to rewind said film withdrawn from said take-up reel.

7. A combination as defined in claim 6 and including indicator means for indicating the amount of film on said supply reel.

8. A combination as defined in claim 6 and including rotatable spindles on which said reels are rotatably mounted, means for keying said supply reel rotatively to its spindle, and friction means for securing said take-up reel rotatively to its spindle.

9. In a motion picture projector: a casing having an opening in one of its sides; a magnifying lens adjustably mounted in said opening; means in said casing for supporting a strip of motion picture film; a light source adapted to project a beam of light through said film; a guide member through which said film is adapted to travel, said guide member having an aperture; shutter means movable intermittently between said aperture and said light source across the beam of light for interrupting the passage of said light beam through said aperture and said film during the feeding of said film and to permit the passage of said light beam through said aperture when each frame of said film is at rest in alignment with said aperture; a feed roller associated with said guide member and across which said film is adapted to pass, said roller having teeth engageable in spaced apertures in said film and adapted upon rotation of said roller to advance said film to align successive frames of said film with said aperture; a ratchet-wheel coaxial with and rotatable with said roller; a lever pivoted in said casing and movable toward and away from said ratchet-wheel; a pawl pivoted on said lever and engageable with successive teeth of said wheel for intermittently advancing said roller; a rotatable cam for pivoting said lever; and a check-pawl actuated by said cam and engageable with said ratchet teeth for preventing retrogressive movement of said ratchet-wheel; said check-pawl being operatively connected to said shutter means for oscillating the same simultaneously with the advancing of the roller.

FRANCIS T. COFFEY, Sr.

REFERENCES CITED

The following references are of record in the file of this patent:

UNITED STATES PATENTS

| Number | Name | Date |
| --- | --- | --- |
| 1,081,548 | Mukautz | Dec. 16, 1913 |
| 1,091,543 | Standeford | Mar. 31, 1914 |
| 1,236,319 | Kleidman | Aug. 7, 1917 |
| 1,268,035 | Marti | Mar. 28, 1918 |
| 1,350,374 | Michalek | Aug. 24, 1920 |
| 1,427,575 | Brenkert | Aug. 29, 1922 |
| 1,573,825 | Grunfeld | Feb. 23, 1926 |
| 1,645,108 | Mann | Oct. 11, 1927 |
| 1,876,845 | Bowen et al. | Sept. 13, 1932 |
| 2,030,206 | Hanley et al. | Feb. 11, 1936 |
| 2,122,804 | Tichenor | July 5, 1938 |